(12) United States Patent
Kato

(10) Patent No.: US 8,582,150 B2
(45) Date of Patent: Nov. 12, 2013

(54) INFORMATION PROCESSING APPARATUS AND METHOD THEREOF

(75) Inventor: Kazunori Kato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 336 days.

(21) Appl. No.: 12/721,438

(22) Filed: Mar. 10, 2010

(65) Prior Publication Data

US 2010/0231947 A1 Sep. 16, 2010

(30) Foreign Application Priority Data

Mar. 13, 2009 (JP) ................................. 2009-060640

(51) Int. Cl.
*G06F 3/12* (2006.01)
(52) U.S. Cl.
USPC .......... 358/1.15; 358/1.13; 709/225; 709/229
(58) Field of Classification Search
USPC .............. 358/1.13, 1.14, 1.15, 1.16; 709/203, 709/219, 225, 228, 229
See application file for complete search history.

(56) References Cited

U.S. PATENT DOCUMENTS

| | | | |
|---|---|---|---|
| 7,246,174 B2 * | 7/2007 | Sciandra et al. | 709/244 |
| 2009/0066990 A1 * | 3/2009 | Segawa et al. | 358/1.15 |
| 2009/0066995 A1 * | 3/2009 | Mukund et al. | 358/1.15 |
| 2009/0180141 A1 * | 7/2009 | Takaishi et al. | 358/1.15 |

FOREIGN PATENT DOCUMENTS

| | | | |
|---|---|---|---|
| JP | 6-251218 A | 9/1994 | |
| JP | 2009-009496 A | 1/2009 | |

* cited by examiner

*Primary Examiner* — Vu B Hang
(74) *Attorney, Agent, or Firm* — Canon USA Inc. IP Division

(57) ABSTRACT

An information processing apparatus configured to calculate an in-operation time of an image processing apparatus includes an authentication log acquisition unit configured to acquire an authentication log including information capable of specifying login time and logout time of a login process in the image processing apparatus, a job log acquisition unit configured to acquire a job log including information capable of specifying job start time and job end time of a job processed by the image processing apparatus, and a calculation unit configured to calculate the in-operation time of the image processing apparatus based on a first in-operation period corresponding to a job processing period specified by the job log and a second in-operation period corresponding to a period which does not overlap a job processing period specified from a job log relating to the authentication log, in a login period specified from the authentication log.

9 Claims, 18 Drawing Sheets

FIG. 7

| JOB LOG ID | JOB TYPE | START TIME | END TIME | USER NAME | AUTHENTICATION ID |
|---|---|---|---|---|---|
| 1000 | COPY | 2007/04/30 14:31:33 | 2007/04/30 14:34:36 | Matsuki | 010 |
| 1001 | SCAN | 2007/04/30 10:01:00 | 2007/04/30 10:02:00 | Kato | 011 |
| 1002 | COPY | 2007/04/30 10:03:00 | 2007/04/30 10:03:34 | Kato | 011 |
| 1003 | PRINT | 2007/05/01 10:12:30 | 2007/05/01 10:13:00 | | |

FIG. 8

| LOG ID 801 | AUTHENTI-CATION ID 802 | USER NAME 803 | AUTHENTICATION (LOGIN) DATE AND TIME 804 | LOGOUT DATE AND TIME 805 | LOGGED OUT DUE TO... 806 | AUTHENTI-CATED VIA... 807 | RESULT 808 |
|---|---|---|---|---|---|---|---|
| 100 | 010 | Matsuki | 2007/04/30 14:30:30 | 2007/04/30 14:35:30 | USER OPERATION | PANEL | NORMALLY AUTHENTICATED 811 |
| 101 | 011 | Kato | 2007/04/30 10:00:00 | 2007/04/30 10:05:00 | TIMEOUT | PANEL | NORMALLY AUTHENTICATED 812 |
| 102 |  | Kato | 2007/05/01 10:00:00 |  |  | Web | FAILED 813 |
| 103 | 012 | Kato | 2007/05/01 10:01:00 | 2007/05/01 10:10:00 | TIMEOUT | PANEL | NORMALLY AUTHENTICATED 814 |
| 104 | 013 | Kato | 2007/05/01 10:12:00 | 2007/05/01 10:13:01 |  | DRIVER | NORMALLY AUTHENTICATED 815 |

FIG. 9

| USER NAME | PASSWORD | |
|---|---|---|
| kato | Akd5sj4f | ~1211 |
| matsuki | saFj98w | ~1212 |
| sakai | vGks9jgla | ~1213 |

| DEVICE ID | IN-OPERATION TIME | |
|---|---|---|
| 1001 | 00:50:30 | ~1411 |
| 1002 | 00:00:30 | ~1412 |
| 1003 | 00:05:00 | ~1413 |
|  |  | |

| AUTHENTICATED VIA… (1701) | JOB TYPE (1702) | |
|---|---|---|
| PANEL | COPY JOB, BOX PRINT JOB, SCAN JOB | ~1711 |
| Web | BOX PRINT JOB | ~1712 |
| DRIVER | PRINT JOB | ~1713 |

INFORMATION PROCESSING APPARATUS AND METHOD THEREOF

BACKGROUND OF THE INVENTION

1. Field of the Invention

The invention relates to a technique for deriving an in-operation time of an image processing apparatus (hereinafter, referred to as a device), such as a printer or a multifunction peripheral.

2. Description of the Related Art

Recently, a device operating rate is used for analysis such as optimum disposition of device and optimum model selection. The operating rate of the device and the like shows a rate of a time (in-operation time) during which the device is used to a time during which the device is operated (for example, working hours). A load state of the device is analyzed with the operating rate, and an optimum model is selected based on a result of the analysis and proposed to a customer.

Conventionally, in a calculation function of an operating rate of device, a time during which a device was used was calculated using a time (job processing time) during which a job was processed. The job processing time is calculated by subtracting the job start time from the job end time based on information of the job start time and the job end time included in log information collected from the device. The job processing time was used for analysis of a device operating state by calculating, for example, a total processing time of jobs processed during a period.

Further, in analysis of an operating rate of a server system of Web application, and the like, as a calculating method for an operating rate of the server, the operating rate was calculated using a time (login time) during which a user was logged in as a time during which the server was used. The login time is calculated by retaining a login history of the server and subtracting login times from logout times. Then, a total time during which the server was logged in during a period was calculated and used for analysis of a server operating state.

In a system discussed in Japanese Patent Application Laid-Open No. 06-251218, a job processing time of an image forming apparatus is measured by detecting times at which copy operations, such as operations of keys of an operation panel or setting of documents to a feeder, are started and measuring the times from the above times to times at which copy processes are ended.

As described above, when an in-operation time and an operating rate of a device was calculated, a time obtained by cumulating job processing times was used as a device in-operation time. However, in that method, a time (in-operation time) until a user issues a job by operating a device is not included in an in-operation time. Further, for example, times relating to operations, which were not processed as jobs in the device such as operations (browse, edit) of documents stored in a box function of the device were not measured in addition to the in-operation times. Further, times, during which although operations relating to jobs were executed, issuing of the jobs was canceled and the like, were not measured.

Intrinsically, in a calculation of a device in-operation time, it is necessary to measure all of the times during which a device is used. Accordingly, in the conventional method for calculating the device in-operation time based on the log information collected from a device, it cannot be said that a proper device in-operation time is calculated.

SUMMARY OF THE INVENTION

The present invention is directed to an information processing apparatus capable of obtaining an in-operation time nearer to an actual operation using log information collected by an image processing apparatus for, for example, proper analysis of an operating rate.

According to an aspect of the invention, an information processing apparatus configured to calculate an in-operation time of an image processing apparatus includes an authentication log acquisition unit configured to acquire an authentication log including information capable of specifying login time and logout time of a login process in the image processing apparatus, a job log acquisition unit configured to acquire a job log including information capable of specifying job start time and job end time of a job processed by the image processing apparatus, and a calculation unit configured to calculate the in-operation time of the image processing apparatus based on a first in-operation period corresponding to a job processing period specified by the job log and a second in-operation period corresponding to a period which does not overlap a job processing period specified from a job log relating to the authentication log, in a login period specified from the authentication log.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is a view illustrating an example of a configuration of a computer constituting an analysis server and the like.

FIG. 7 is a view illustrating a job log information table.

FIG. 8 is a view illustrating an authentication log information table.

FIG. 9 is a table for storing authentication information of respective users.

FIG. 14 is a view illustrating a configuration of an analysis result table.

FIG. 17 is a view illustrating an authentication route/job type relating table.

DESCRIPTION OF THE EMBODIMENTS

Various exemplary embodiments, features, and aspects of the invention will be described in detail below with reference to the drawings.

Figure 1:
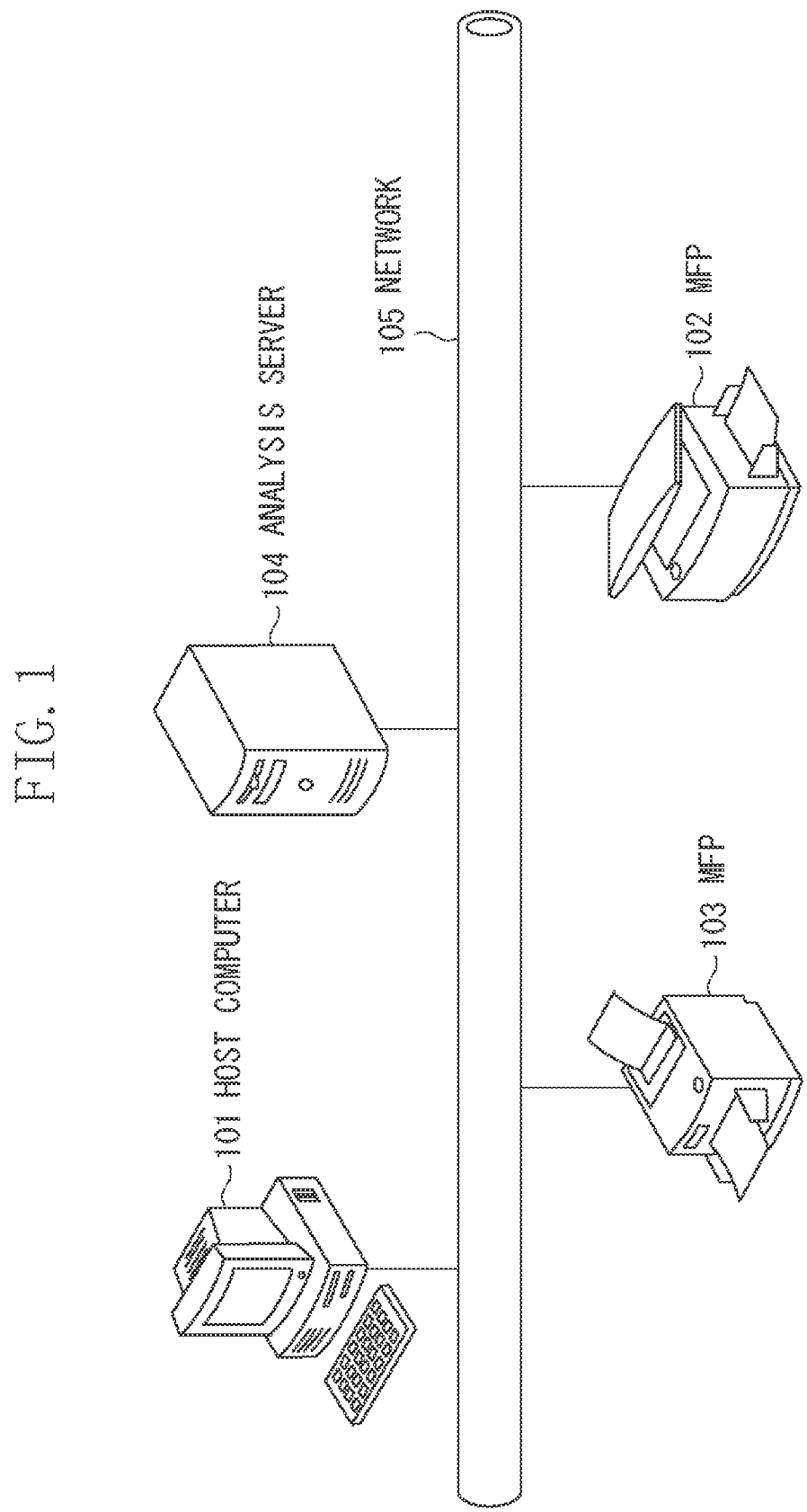
FIG. 1 is a view illustrating a configuration of a device operating state analysis system according to a first exemplary embodiment of the invention.

FIG. 1 is a schematic view illustrating a configuration of a system for analyzing a device operating state according to a first exemplary embodiment of the invention. In FIG. 1, reference numeral 101 denotes a host computer which is used by a user for generation of image data and via which the user instructs a print. Reference numerals 102 and 103 denote multifunction peripherals for receiving print data from the host computer 101 and the like via a network and executing a print task on actual papers making use of a known print technique such as an electrophotographic technique or an inkjet technique.

The multifunction peripherals 102 and 103 have functions for reading paper documents via scanners, copying the paper documents read thereby, converting the read paper documents to image data, and transmitting the image data by E-mail, facsimile, and the like. Note that, although multifunction peripherals are exemplified here, it is needless to say that a single-function image processing apparatus (device) which does not have a copy function and includes a printer, a scanner, and the like may be a target device for an operating state analysis. Reference numeral 104 denotes an analysis server for analyzing operating states of the multifunction peripherals 102 and 103. The host computer 101, the multifunction peripherals 102 and 103, and the analysis server 104 are connected to one another via a network 105 of a known technique such as Ethernet so that they communicate one another.

In the exemplary embodiment, although the analysis server 104 is provided independently of the multifunction peripherals 102 and 103, a module having the same function may be disposed internally of each of the multifunction peripherals 102 and 103. In this case, it is considered that the network communication executed between the analysis server 104 and the multifunction peripherals 102 and 103 is replaced by delivery of data via a system bus and the like.

Figure 2:
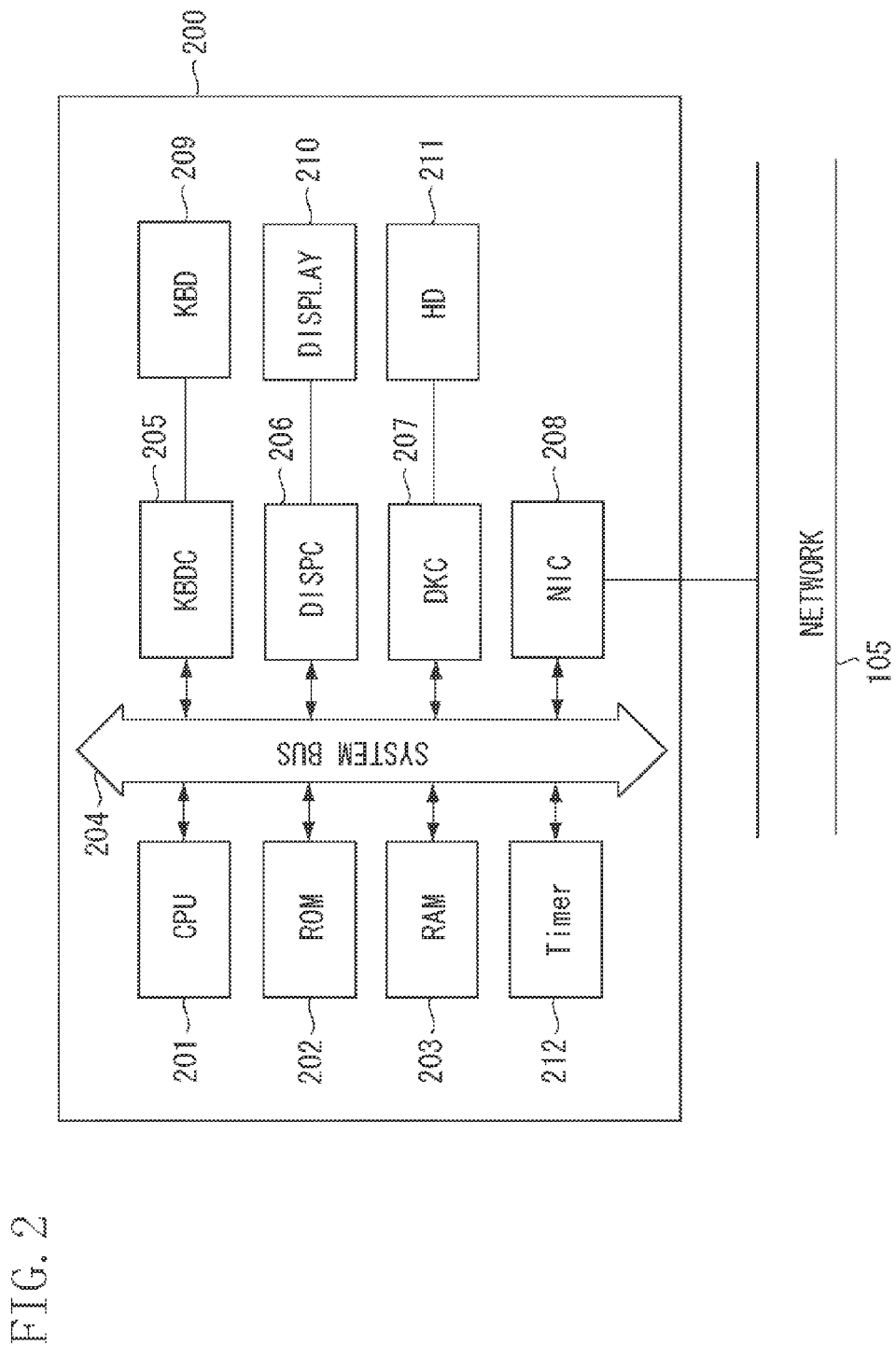

FIG. 2 is a view illustrating an example of an internal configuration of a computer constituting the host computer 101 and the analysis server 104. In FIG. 2, reference numeral 200 denotes an entire computer (PC). The PC 200 includes a CPU 201 for executing software stored in a ROM 202 or in a large scale storage device 211, for example, a hard disk (HD) and the like. The CPU 201 integrally controls respective devices connected to a system bus 204.

Reference numeral 203 denotes a RAM acting as a main memory, a work area, and the like for the CPU 201. Reference numeral 205 denotes a keyboard control unit (KBDC) for controlling an instruction input from a keyboard (KBD) 209 disposed to the PC 200. Reference numeral 206 denotes a display control unit (DISPC) for controlling a display of a display module (DISPLAY) 210 composed of, for example, a liquid crystal display and the like. Reference numeral 207 denotes a disk control unit (DKC) for controlling the large scale storage device such as the hard disk (HD) 211 as a large capacity storage device. Reference numeral 208 denotes a network interface card (NIC) for bidirectionally transmitting and receiving data to and from other nodes via the network 105. Reference numeral 212 denotes a timer.

Figure 3:
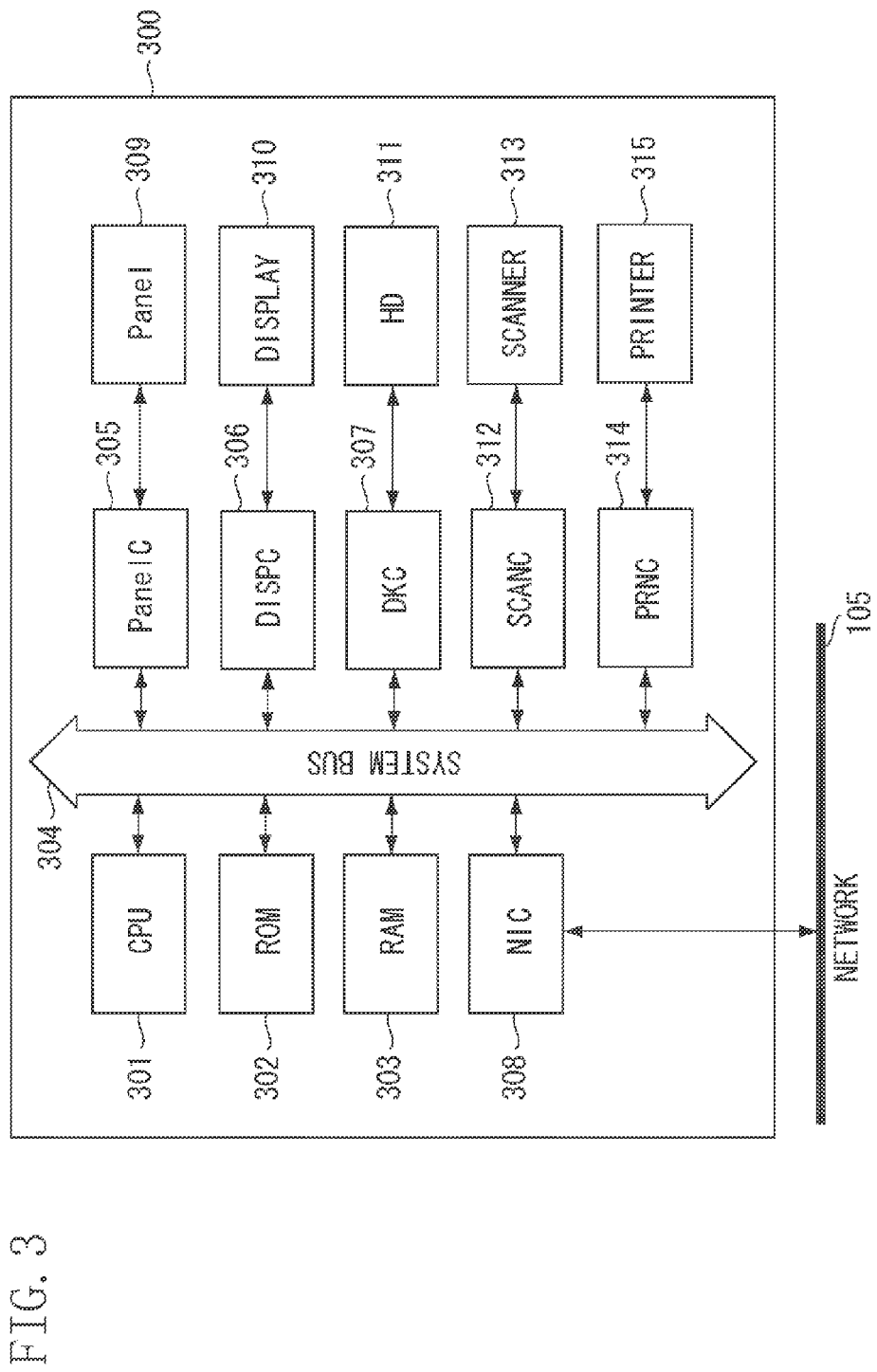
FIG. 3 is a block diagram illustrating an example of an internal configuration a multifunction peripheral.

FIG. 3 is a block diagram illustrating an example of an internal configuration of the multifunction peripheral 102 or 103. In FIG. 3, reference numeral 300 denotes an entire multifunction peripheral. The multifunction peripheral 300 includes a CPU 301 for executing software stored in a ROM 302 or in a large scale storage device 311 of, for example, a hard disk (HD) and the like. The CPU 301 integrally controls respective devices connected to a system bus 304. Reference numeral 303 denotes a RAM acting as a main memory, a work area, and the like for the CPU 301. Reference numeral 305 denotes a panel control unit (Panel C) for controlling an instruction input from an operation panel 309 disposed to the multifunction peripheral.

Reference numeral 306 denotes a display control unit (DISPC) for controlling a display of a display module (DISPLAY) 310 composed of, for example, a liquid crystal display and the like. Reference numeral 307 denotes a disk control unit (DKC) for controlling the hard disk (HD) 311 as a large capacity storage device. Reference numeral 308 denotes a network interface card (NIC) for transmitting and receiving data to and from other nodes via the network 105. Reference numeral 312 denotes a scanner control unit (SCANC) for reading a paper document by controlling an optical scanner 313 disposed to the multifunction peripheral. Reference numeral 314 denotes a printer control unit (PRNC) for printing an actual paper making use of the known print technique such as the electrophotographic technique and the inkjet technique by controlling the printer 315 disposed to the multifunction peripheral.

Figure 4:
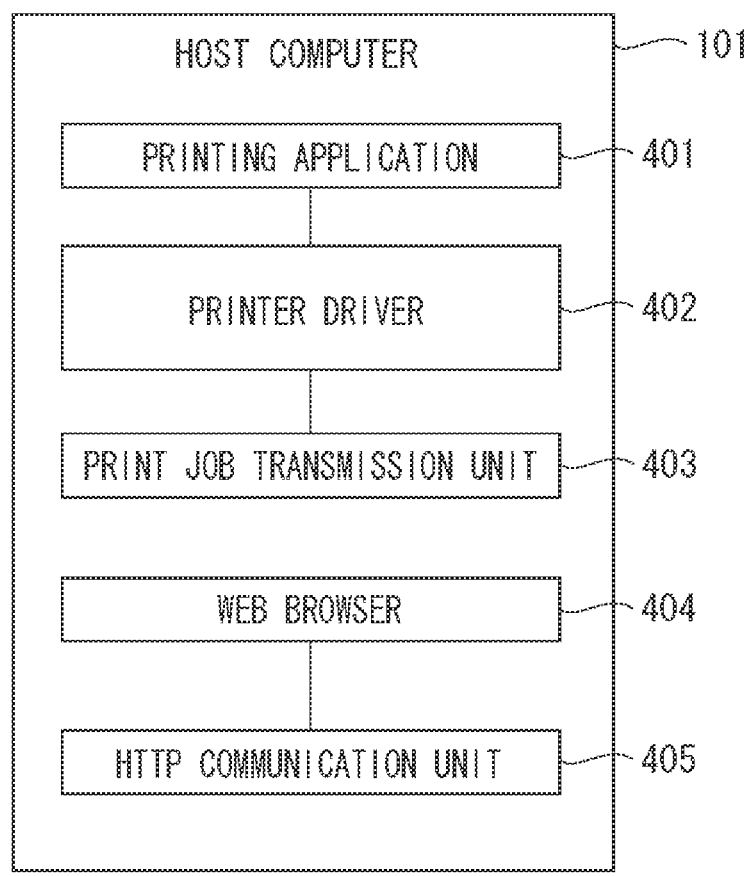
FIG. 4 is a block diagram illustrating a detailed functional configuration of a host computer.

FIG. 4 is a block diagram illustrating a detailed functional configuration of the host computer 101. In FIG. 4, reference numeral 401 denotes a printing application for instructing print, and the printing application instructs print by transmitting a drawing instruction and the like to a printer driver 402. The printer driver 402 converts the drawing instruction and the like received from the printing application to print data, i.e., to PDL (Page Description Language), which can be interpreted by the multifunction peripherals 102 and 103.

Further, when a device authentication is set, the printer driver 402 displays a user authentication dialog and requests the user to input a user name and a password for using the multifunction peripheral. Then, the printer driver 402 transmits the input user name and password to a multifunction peripheral of a print destination via the network 105 and requests an authentication to the multifunction peripheral. The multifunction peripheral matches the user name with the password by an the authentication process unit 613 (FIG. 6) to be described below and responds whether the name is normally authenticated or the authentication of the name fails to the printer driver 402.

When the authentication of the name fails, the printer driver 402 cancels the print. In contrast, when the name is normally authenticated, the printer driver 402 adds the input user name to a print job as job owner information and generates a print job. Note that when the device authentication is not set to the printer driver 402, the printer driver 402 adds the user name logged in the host computer to the print job as the job owner information and generates the print job.

Subsequently, the printer driver 402 transmits generated print job data to a print job transmission unit 403. The print job transmission unit 403 transmits the print job received from the printer driver 402 to the multifunction peripheral. Reference numeral 404 denotes a Web browser for interpreting HTML data, drawing an image on the display 210, receiving a user manipulation from the keyboard and the like, and transmitting a request to an HTTP communication unit 405.

Note that a Web shows a World Wide Web, and HTML shows HyperText Markup Language.

Reference numeral 405 denotes an HTTP communication unit for receiving a communication request from the Web browser 404, communicating with the multifunction peripheral and the like via the NIC 208 using an HTTP or HTTPS protocol and requesting a Web page, and receives Web page data. Note that HTTP shows HyperText Transfer Protocol, and the HTTPS shows Hypertext Transfer Protocol over Secure Socket Layer. Note that the respective functional units 401 to 405 described above are realized by the CPU 201 of the host computer 101, which reads and executes programs stored in the HD 211 and the like of the host computer 101.

Figure 5:
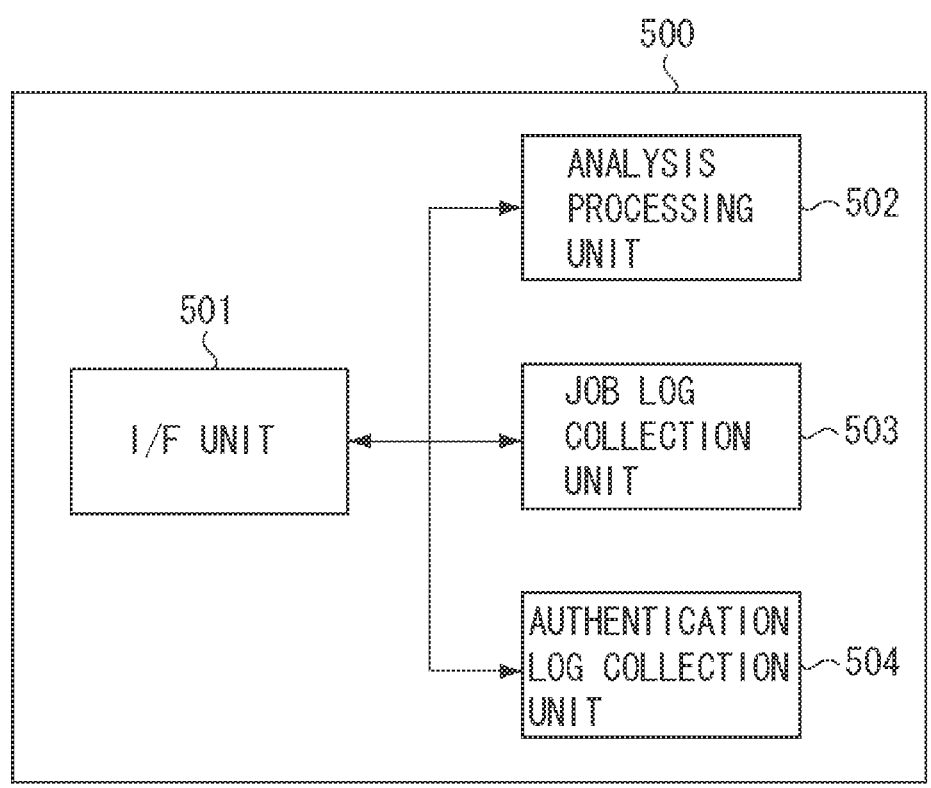
FIG. 5 is a block diagram illustrating a detailed functional configuration of the analysis server.

FIG. 5 is a block diagram illustrating a detail function configuration of the analysis server 104. In FIG. 5, reference numeral 500 denotes the analysis server 104 in its entirety. Reference numeral 501 denotes an I/F unit for communicating with the multifunction peripherals 102 and 103 via the NIC 208 and the network 105. Reference numeral 502 denotes an analysis processing unit for executing a device operating state analysis process based on a job log and an authentication log and recording a result of analysis to the storage device 211.

Reference numeral 503 denotes a job log collection unit for executing a job log acquisition process for collecting job log information (illustrated in FIG. 7 to be described below) from the multifunction peripherals 102 and 103 and storing the job log information in the storage device 211 of the analysis server 104. Reference numeral 504 denotes an authentication log collection unit for executing an authentication log acquisition process for collecting authentication log information (illustrated in FIG. 8 to be described below) from the multifunction peripherals 102 and 103 and storing the authentication log information in the storage device 211 of the analysis server 104. The log information may be collected by being transmitted from the devices at a predetermined time or by being requested from the analysis server side. Note that the respective functional units 501 to 504 are realized by the CPU 201 of the analysis server 104, which reads and executes programs stored in the HD 211 and the like of the analysis server 104.

Figure 6:
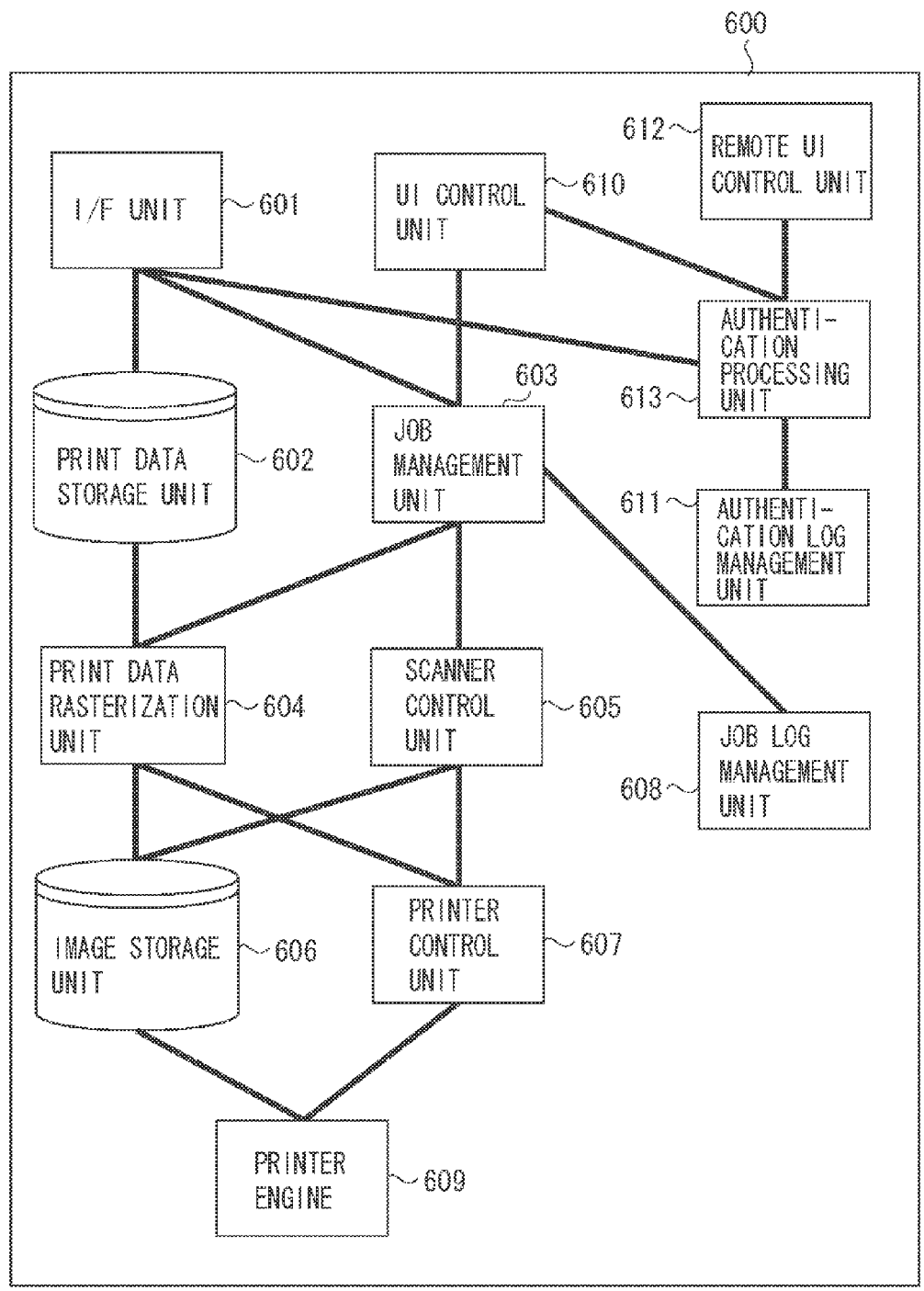
FIG. 6 is a block diagram illustrating a detailed functional configuration of the multifunction peripheral.

FIG. 6 is a block diagram illustrating a detailed functional configuration of the multifunction peripherals 102 and 103. In FIG. 6, reference numeral 600 denotes an entire multifunction peripheral. Reference numeral 601 denotes an I/F unit connected to the network 105 for receiving a print job from the host computer 101. Reference numeral 602 denotes a print data storage unit for temporarily storing print job data in the RAM 303 and the hard disk (HD) 311. Reference numeral 610 denotes a UI control unit for controlling the operation panel 309 via the panel control unit (Panel C) 305 and receiving a login request to the multifunction peripheral, a copy instruction, and a scan transmission instruction of the user.

When the UI control unit 610 receives the login request from the user, it transmits the user name, the password, and the like to the authentication process unit 613 and requests an authentication. When the authentication process unit 613 is normally authenticated, the UI control unit 610 receives an authentication ID from the authentication process unit 613. Thereafter, the UI control unit 610 retains the user name and the authentication ID until it receives a logout request, and when the UI control unit 610 is instructed to issue a job such as a copy and the like by the user manipulation, it transmits the user name and the authentication ID to the job management unit 603 together with a job issue request. Further, when a logout operation is executed from the operation panel, the UI control unit 610 executes a logout process.

Further, the UI control unit 610 has "timeout time" as operation set information, and when an operation is not executed from the operation panel in a time set by "timeout time", the UI control unit 610 executes the logout process. Note that a set value of "timeout time" can be referred to also from an external module, for example, from the analysis server 104 and the like. Further, "timeout time" can be set via the panel 309 of the multifunction peripheral, the host computer 101, and the like. Further, in the logout process, the UI control unit 610 notifies the authentication process unit 613 of a logout together with the user name, the authentication ID, and logout cause information and discards authentication information and the authentication ID.

The job management unit 603 analyzes the print job, obtains output attribute information such as the user name, a number of prints, a color print, and the like, and manages the output attribute information together with job start time as job information. When a job such as a copy and the like is issued from the operation panel, the job management unit 603 receives the output attribute information, the user name, and the like from the UI control unit 610, and when the job is issued from the Web browser, the job management unit 603 receives them from a remote UI control unit 612. Reference numeral 604 denotes a print data rasterization unit for executing an image generation process by obtaining the print data from the print data storage unit 602 and generating image data according to job information stored in the job management unit 603.

Reference numeral 605 denotes a scanner control unit for controlling the scanner controller 312, scanning a paper document, and generating image data. Reference numeral 606 denotes an image storage unit for temporarily storing the image data generated by the print data rasterization unit 604 and the scanner control unit 605 in the RAM 303 and the hard disk (HD) 311.

Reference numeral 607 denotes a printer control unit for controlling a printer engine 609 and causing it to print image data stored in the image storage unit 606. The printer engine 609 shows a printer device for actually printing image data stored in the image storage unit to media such as print papers using a known print technique such as an electrophotographic technique or an inkjet technique.

Reference numeral 608 denotes a job log management unit for storing and managing job log information (job log information illustrated in FIG. 7). When a job completed, the job management unit 603 transmits job information to be managed to the job log management unit 608 as the job log information, and the job log management unit 608 stores the job log information. Further, the job log management unit 608 transmits the job log information in response to a request from the analysis server 104.

The remote UI control unit 612 operates as an HTTP or HTTPS server and receives a request from the Web browser 404 operating on the host computer 101. When the remote UI control unit 612 receives a request from the Web browser 404, it obtains the authentication information from session information and inquires the authentication process unit 613 whether access is possible. When the access is permitted by the authentication process unit 613, the remote UI control unit 612 transmits requested HTML data to the Web browser 404. In contrast, when the access is not permitted by the authentication process unit 613, the remote UI control unit 612 transmits HTML data for displaying login form screen to the Web browser 404.

When the remote UI control unit 612 receives input data to a login form from the Web browser 404, it transmits an authentication request to the authentication process unit 613, and when authentication is normally executed, the remote UI control unit 612 transmits the requested HTML data to the Web browser 404. The authentication process unit 613 executes an authentication process and a management to the multifunction peripheral. The authentication process unit 613 executes the user authentication based on a login name, the password, and the like input by the user to the operation panel 309 and the login name of the Web browser 404. Further, the authentication process unit 613 receives the authentication request from the printer driver 402 and matches the user name and the password, and when an authentication is normally executed, it issues the authentication ID and returns the authentication ID together with information indicating whether the authentication is normally executed or fails.

The authentication process unit 613 retains an authentication information table (FIG. 9) and authenticates the user by comparing the user with the user name and the password registered to the table. Otherwise, the authentication process unit 613 may communicate with a authentication server (not shown) and may authenticate the user using an authentication information table retained on the authentication server side. When the authentication process unit 613 executes the authentication process, it transmits information such as the authentication ID, a login user name, login time, logout time, normal authentication and failed authentication, an authentication route, and the like as authentication log information and stores the information in an authentication log management unit 611.

Note that information used as authentication route information may determine from which module the authentication process unit 613 received the login request, and a module on the login request side may transmit identification information. Further, when the authentication process unit 613 receives a logout notification, it transmits the received user name, authentication ID, and logout cause information to the authentication log management unit 611, which adds the information to the authentication log information.

The authentication log management unit 611 stores and managements the authentication log information (authentication log information illustrated in FIG. 8 described below). The authentication log information includes the authentication ID, the login user name, the login time, the logout time, and the like as illustrated in FIG. 8 described below. Further, the authentication log management unit 611 transmits an authentication log in response to a request from the analysis server 104.

FIG. 7 is a view illustrating a table (job log information table) for storing the job log information retained in the job log management unit 608. In FIG. 7, reference numeral 701 denotes a job log ID which is an ID for uniquely identifying job logs in a system. Reference numeral 702 denotes a job type. Shown as the job type 702 here are a print as a print from the host, a copy and a scan on the multifunction peripheral, a box print for printing documents stored in the multifunction peripheral. In addition to the above mentioned, SEND for transmitting data from the multifunction peripheral to an external device, and the like are also included as the job type.

Reference numeral 703 denotes start time. The job start time can be specified by the start time 703. Reference numeral 704 denotes end time. A job endpoint can be specified by the end time 704. Reference numeral 705 denotes the user name and records the user name of the user who issued a job. Reference numeral 706 denotes an authentication ID which is an ID (authentication ID of a login process corresponding to the job) of the authentication log recorded when the job was issued.

The job log management unit 608 records information showing who starts what job at what time and end it at what time. Reference numerals 711 to 713 denote respective job logs. For example, reference numeral 711 shows a job log as to a "print" job which was started by a user "Matsuki" at "2007/04/30 14:31:33" and ended at "2007/04/30 14:34:36". Note that the job log information table may be arranged to each type of job.

FIG. 8 is a view illustrating a table (authentication log information table) for storing the authentication log information retained in the authentication log management unit 611. In FIG. 8, reference numeral 801 denotes an log ID which is an ID for uniquely identifying the authentication logs in the system. Reference numeral 802 denotes an authentication ID which is issued by the authentication process unit 613 when an authentication is normally executed. Here, the authentication is normally executed and the user normally executes the login process. Reference numeral 803 denotes a user name designated when the authentication request is issued. Reference numeral 804 denotes time at which the authentication (login) request is issued. When an authentication is normally executed, the time has the same meaning as the login time. Accordingly, the login time can be specified by the authentication time 804 at which the authentication request is issued. Reference numeral 805 denotes the logout time which records time at which the user designates a logout by the operation panel 309 and the Web browser 404, and time at which the logout is automatically executed when an operation is not executed for a predetermined time. The logout point can be specified by the logout time 805.

Reference numeral 806 denotes a logout cause which records whether the user designates the logout by the operation panel 309 and the Web browser 404 (user manipulation) and whether the logout is automatically executed when the operation is not executed for the predetermined time (timeout). Reference numeral 807 denotes an authentication route for recording a type of a module which transmits the authentication request to the authentication process unit 613. Exemplified as a type of the authentication route are the operation panel 309 (panel) the Web browser 404 (Web), the printer driver 402 (driver), and the like. Reference numeral 808 denotes a result and records whether an authentication is normally executed or fails.

Reference numerals 811 to 815 denote respective authentication logs. The authentication log 811 shows that the user "Matsuki" normally executed a login from "panel" at "2007/04/30 14:35:30" and executed a logout by "user manipulation" at "2007/04/30 14:30:30".

FIG. 9 is a table for storing authentication information of respective users retained by the authentication process unit 613. In FIG. 9, respective rows show user entries, and respective columns describe the authentication information of the respective users. Reference numeral 1201 denotes the user name, and reference numeral 1202 denotes the password. The row 1211 shows a user entry of name "Kato". The password has a character string of "Akd5sj4f". Likewise, a user entry of name "Matsuki" is defined in row 1212, and a user entry of name "Sakai" is defined in row 1213.

Figure 10:
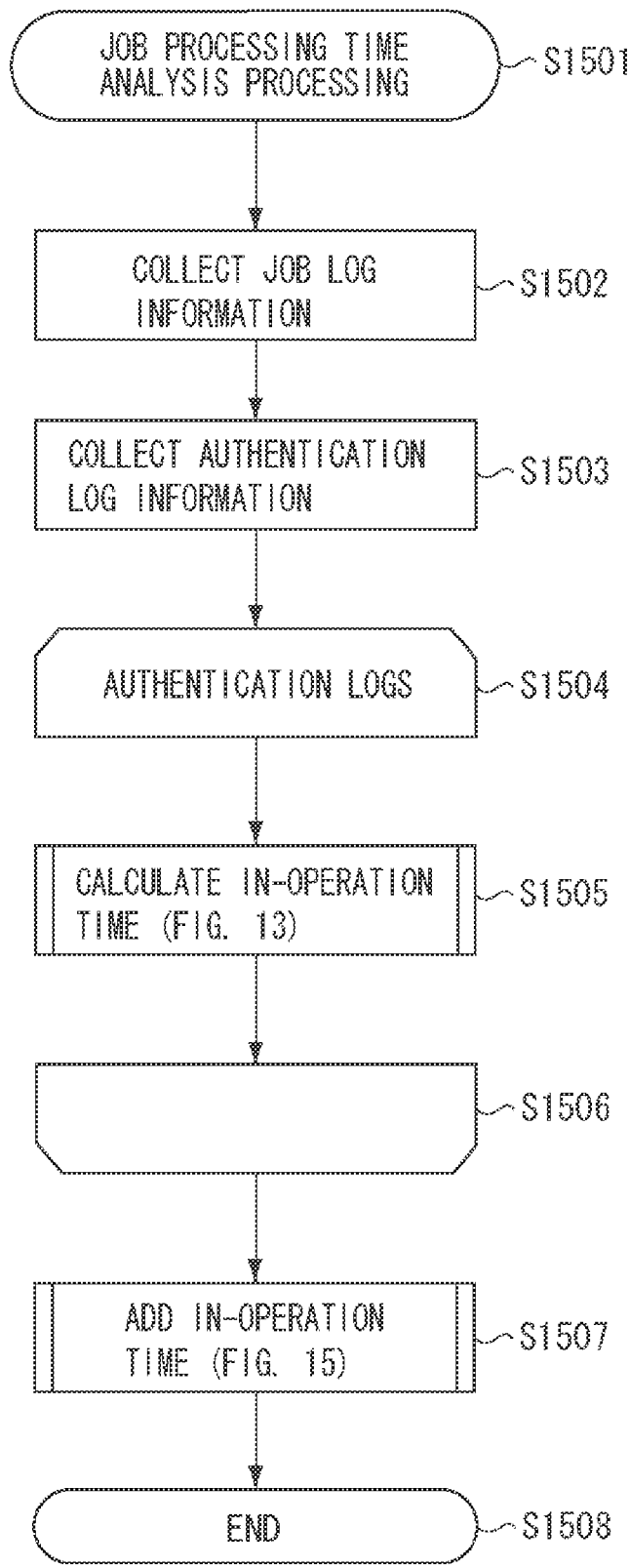
FIG. 10 is a flowchart illustrating a flow of analysis processing of an in-operation time according to the first exemplary embodiment of the invention.

FIG. 10 is a flowchart illustrating an analysis flow for an in-operation time executed by the analysis server 104 according to the first exemplary embodiment of the invention. The process illustrated in the flowchart is executed by respective functional units of the analysis server 104. That is, the process is realized by the CPU 201 of the analysis server 104, which reads and executes a program stored on the HD 211 and the like of the analysis server 104.

First, in step S1501, the analysis processing unit 502 of the analysis server 104 starts a job processing time analysis process. In step S1502, the job log collection unit 503 of the analysis server 104 communicates with the multifunction peripherals 102 and 103 via the I/F unit 501 and collects the job log information managed by the job log management unit 608. Then, the job log collection unit 503 stores the obtained job log information in a job log information table as illustrated in FIG. 7. Note that the job log information is stored in a table of the type in which columns (not illustrated) of "corrected in-operation time" are disposed to the job log information table in FIG. 7. Further, when the log information is collected from plural devices, it is managed by columns of device identifiers disposed on the table.

Subsequently, in step S1503, the authentication log collection unit 504 of the analysis server 104 communicates with the multifunction peripherals 102 and 103 via the I/F unit 501 and collects the authentication logs managed by the authentication log management unit 611. Then, the authentication log collection unit 504 stores the obtained authentication logs with the authentication log information table as illustrated in FIG. 8. Note that the obtained authentication logs are stored in a table of the type in which columns of "corrected in-operation time" (not illustrated) are disposed to the authentication log information table in FIG. 8. Further, when the log information is collected from plural devices, it is managed by columns of device identifiers disposed on the table.

Processes for calculating the in-operation time will be described below. In a loop of steps S1504 to S1506, the analysis processing unit 502 executes control for sequentially processing the respective authentication logs obtained in step S1503 as processing targets and executing a process in step S1505. In step S1505, the analysis processing unit 502 executes a calculation process of the in-operation time by the authentication logs as the processing targets. That is, the analysis processing unit 502 calculates in-operation times due to logins corresponding the authentication logs as the processing targets (including in-operation times corresponding to in-operation times corresponding to predetermined operations and in-operation times corresponding to job processing times). The in-operation time calculation process will be described in detail in FIG. 13 to be described below.

Then, when the analysis processing unit 502 executes the process in step S1505 to all of the authentication logs, it exits the loop of steps S1504 to S1506 and goes to step S1507. In step S1507, the analysis processing unit 502 totals the in-operation times calculated in steps S1504 to S1506, calculates total in-operation times of respective devices, and outputs them to an analysis result table (FIG. 14). Then, the analysis process of the job processing time is ended (step S1508). Note that the in-operation time addition process in step S1507 will be described below in detail in FIG. 15.

Figure 11:
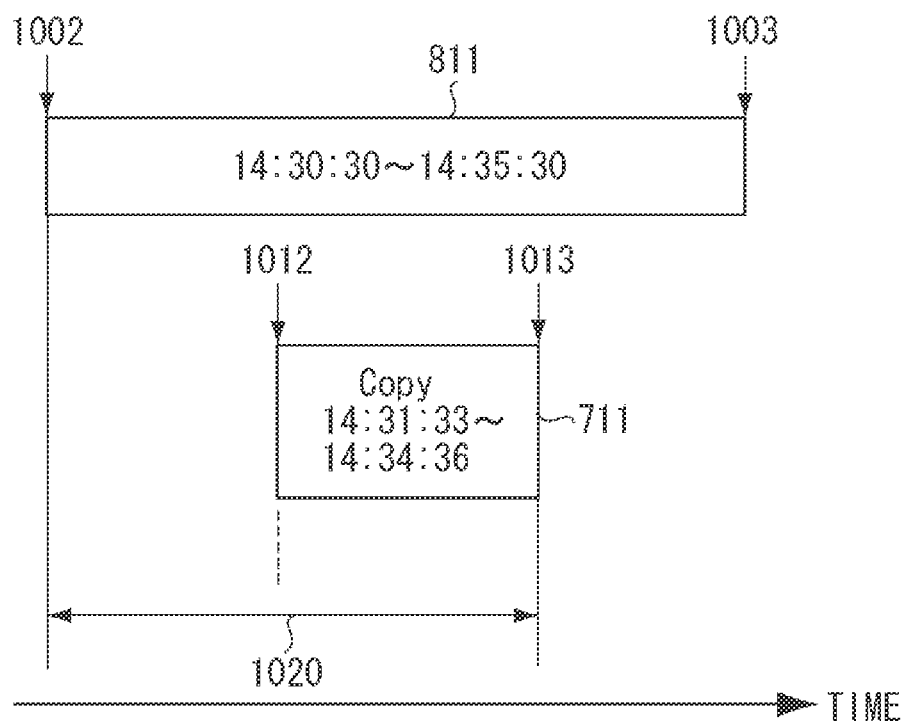
FIG. 11 is a view illustrating a concept of a calculation process of an in-operation time relating to a job process.
Figure 12:
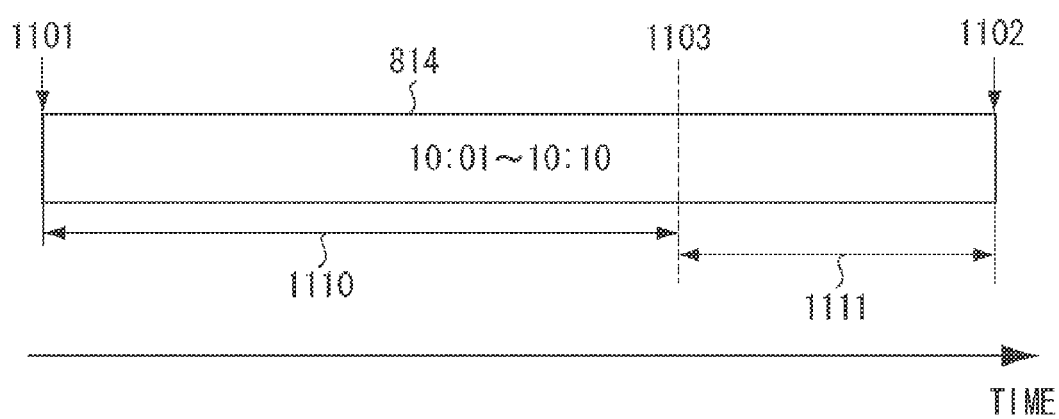
FIG. 12 is a view illustrating a concept of the calculation process of the in-operation time executed with an authentication log.

The calculation process of the in-operation time in step S1505 in FIG. 10 will be described below in detail referring to FIGS. 11 to 13. FIG. 11 is a view illustrating a concept of the in-operation time calculation process relating to a job process in the analysis processing unit 502 of the analysis server 104.

<Simple system> In FIG. 11, the vertical axis shows a time axis, and a right direction shows a flow of time. In FIG. 11, an authentication log 811 corresponds to the authentication log 811 of the authentication log information table in FIG. 8. The authentication log 811 shows that a login was executed at "2007/04/30 14:30:30" and a logout was executed at "2007/04/30 14:35:30". In contrast, a job log 711 corresponds to the job log 711 of the job log information table in FIG. 7. The job log 711 shows that a job was started at "14:31:33" and ended at "14:34:36".

An in-operation time of a job (pure job processing time) when an in-manipulation time until the job is issued in a device is not taken into consideration is determined by the following expression:

In-operation time of job when in-manipulation time is not taken into consideration=[job end time]−[job start time]

Since a copy job of the job log 711 has an authentication ID "010", it can be found that a job was issued during login periods 1002 to 1003 illustrated in the authentication log 811 whose authentication ID agrees with the authentication ID "010". Therefore, a manipulation is started from time 1012 in which the user logs in, and the job is started at time 1012 and ended at time 1013. That is, it is presumed that a period from time 1002 to time 1012 is an in-manipulation time, and a period from time 1012 to time 1013 becomes a job processing time.

From what has been described above, it is considered that the in-operation time of the device due to the job illustrated by the job log 711 is time 1002 to time 1013, that is, a time illustrated by 1020 in FIG. 11. Further, when plural jobs are processed based on a login executed once, it is presumed that a time from end time of a most recent job to start time of each of the jobs processed second and thereafter is a manipulation time thereof. From what has been described above, it is considered that an in-operation time of a device due to the job is a time from the end time of the most recent job to the start times the jobs (in-manipulation time of the user)+the time from the end time of the job to the start times of the job (job processing time). That is, it is considered that the in-operation time of the device due to the job is from the end time of the most recent job to the end time of the job.

As illustrated in the above, it is considered that a time until a first job starts after the user logs in. Therefore, these times (the user in-manipulation times) are added to the job processing time, and the in-operation time is corrected (hereinafter, called a corrected in-operation time). As a result, an in-operation time nearer to an actual in-operation time cab be determined. Note that, since a logout cause of the authentication log 811 is "user manipulation" and the authentication route 807 is "panel", it can be found that a copy job ends at time 1013, and a logout is executed at time 1003 by the user manipulating the panel. That is, it is presumed that a period from time 1013 to time 1003 is a logout in-manipulation time by the user.

From what has been described above, it is considered that the user in-manipulation time due to the authentication log 811 is the period from time 1002 to time 1012 and the period from time 1013 to time 1003. That is, it is considered that a user in-manipulation period due to the authentication log 811 is a period which does not overlap the job processing periods 1012 to 1013 of the relating job log 711 of the login periods 1002 to 1003 of the authentication log 811. Note that this is the same as a case where plural jobs are processed based on a login executed once. However, when the logout cause is "timeout", and the like, it is necessary to remove a period required for the timeout from the user in-manipulation period (this will be described in detail in the following "without-job system").

<Without-job system> When the user manipulates the device, he or she does not necessarily issue a job. There may be a case where the user executes a manipulation for browsing, editing, deleting, and the like of a document registered to the multifunction peripheral, and there is also considered a case where the user ends a manipulation when it is being executed without issuing a job. Since the device is occupied during the time (in-manipulation time), the time must be included in the in-operation time. FIG. 12 is a view illustrating a concept of a calculation process of the in-operation time by an authentication log in the analysis processing unit 502 of the analysis server 104. In FIG. 12, the vertical axis indicates a time axis and a right direction shows a flow of time. In FIG. 12, an authentication log 814 corresponds to the authentication log 814 of the authentication log information table in FIG. 8. The authentication log 814 shows that a login was executed at "2007/05/01 10:01:00" and a logout was executed at "2007/05/01 10:10:00".

Further, in the authentication log 814, the logout cause is the "timeout". In this case, the user naturally executes no manipulation in a time during which a timeout occurs before a logged-out time (period 1111 in FIG. 12). Further, the user can ordinarily use the device during the above time. The period 1111 in FIG. 12, during which no job is processed and the user executes no manipulation at all, must not be included in the in-operation time. Therefore, in this case, a time 1110, from which the timeout time 111 in FIG. 12 is omitted becomes the in-operation time by the authentication log 814. In the example in FIG. 12, login time up to time at which a logout 1102 is executed after a login 1101 is 9 minutes (10:01 to 10:10), and when, for example, the timeout time (1111) is 3 minutes, the in-operation time is 6 minutes. Here, it is regarded that a time at which the user ends the manipulation is time 1103.

Note that setting of the timeout time is retained by the UI control unit 610 of the multifunction peripheral and can be obtained also from the analysis server 104 via the network. In contrast, when the logout cause in the authentication log 814 is the "user manipulation", since it is considered that the user occupies the device also in a time until the logout is executed after a job ends (in-manipulation time), the time must be included in the in-operation time. That is, it is considered that a user in-manipulation period due to the authentication log 814 is a period which does not overlap the job processing period of the relating job log of the login period from time 1101 to time 1102 of the authentication log 814. Note that when a relating job is not issued, the login period agrees with the user in-manipulation period.

Accordingly, in any of the <simple system> and the <without-job system>, a device in-operation time is shown as follows. In the job processing period (first in-operation period) and a period in which the user logs in, a sum of times corresponding to a user in-manipulation period (second in-operation period) becomes an in-operation time of the device. However, when the logout cause is the "timeout", a period necessary to the timeout is not included in the user in-manipulation period.

Further, although a detail will be described below, when the authentication route 807 is "Web", the multifunction peripheral is not occupied and a process is not executed in a time from a job end to a logout. Therefore, when the authentication route 807 is "Web", it is not necessary to include a period from time at which a final relating job ends to time of the logout in the in-operation time. Accordingly, when the authentication route 807 is "Web", the period from the time at which the final relating job ends to the time of the logout in the in-operation time is not included in the user in-manipulation period. Further, when the authentication route 807 is a "driver", a time other than the job processing time is not occupied by the multifunction peripheral, it is not necessary to include the time other than the job processing time to the in-operation time. Accordingly, when the authentication route 807 is "driver", the login period of the driver is not included in the user in-manipulation period.

Figure 13:
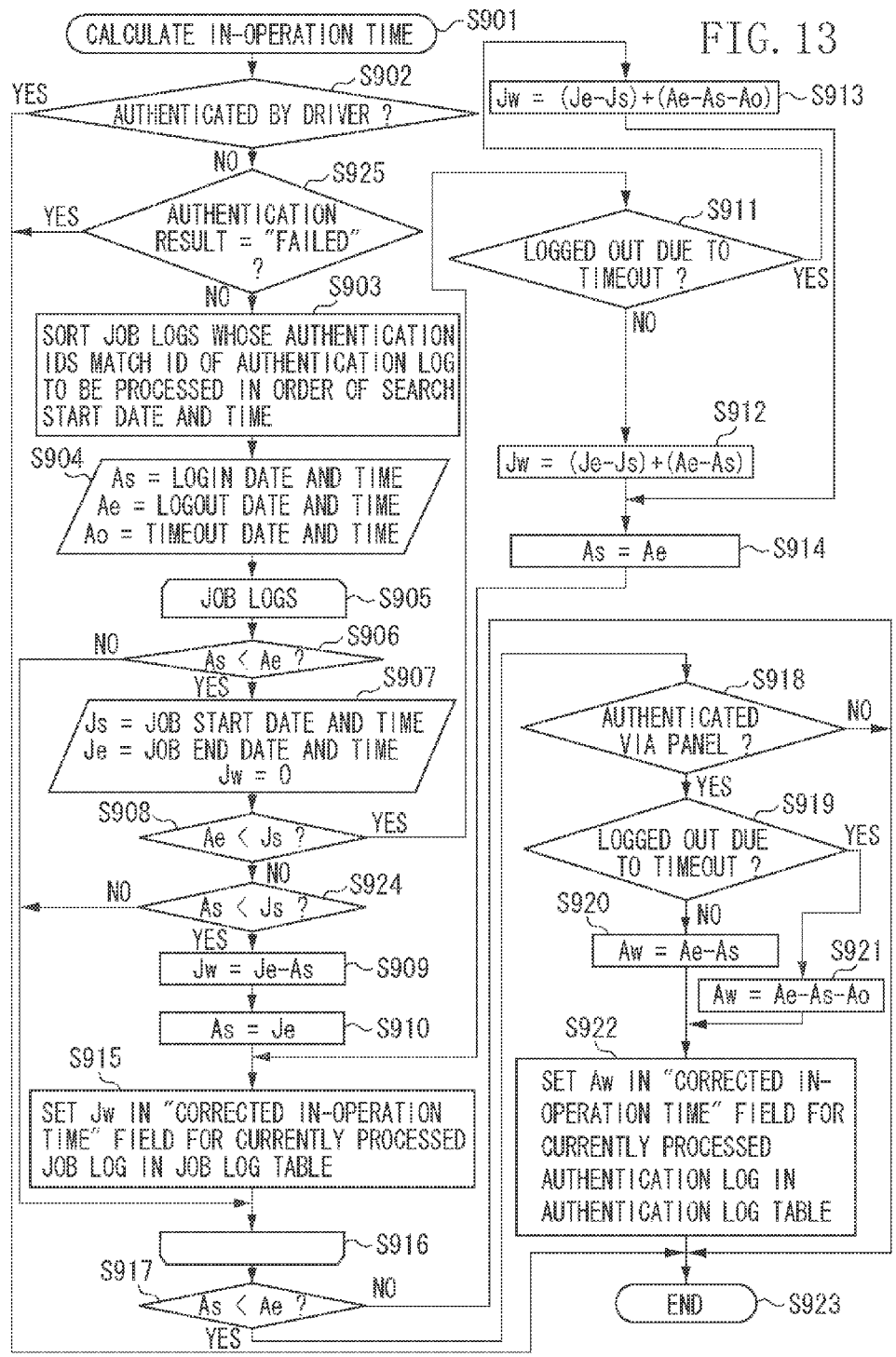
FIG. 13 is a flowchart illustrating an in-operation time calculation process in step S1505 in FIG. 10.

FIG. 13 is a flowchart illustrating an example of a detailed flow in the in-operation time calculation process (calculation process of the in-operation time including a correction process by each authentication log) illustrated in step S1505 in FIG. 10. The process illustrated in the flowchart is executed by the analysis processing unit 502 of the analysis server 104. That is, the process is realized by the CPU 201 of the analysis server 104, which reads and executes a program stored in the HD 211 and the like of the analysis server 104.

First, in step S901, the analysis processing unit 502 of the analysis server 104 starts the in-operation time calculation process to an authentication log of a processing target. In step S902, the analysis processing unit 502 determines whether an authentication route 807 of the authentication log of the processing targets is the "driver" (printer driver). When the analysis processing unit 502 determines that the authentication route 807 is the "driver", the analysis processing unit 502 ends the in-operation time calculation process (steps S923). Note that the authentication processing executed from the printer driver 402, after the authentication processing from the printer driver 402 ends, a print job is input to the multifunction peripheral via the network 105. Therefore, the multifunction peripheral is not occupied in a time until the job is input and no process is executed. Therefore, in this case, a time from a login to a start of the job, a time from an end of a most recent job to a start of a next job, and a time from an end of a final job to a logout are not included to the in-operation time.

Note that although the process is ended in step S902 when the authentication route 807 is the "driver", the process may be ended when the authentication route 807 is the "driver" or the "Web" (that is, when it is not the "panel"). In contrast, when it is determined step S902 that the authentication route 807 is not the "driver", the analysis processing unit 502 goes to a process in step S925. In step S925, the analysis processing unit 502 determines whether the result 808 of the authentication log of the processing target is "failed". When the analysis processing unit 502 determines that the result 808 is "failed", the analysis processing unit 502 ends the in-operation time calculation process (steps S923). In the exemplary embodiment, when the login process fails, a login process time is not included in the in-operation time, it may be included in the in-operation time.

In contrast, when it is determined in step S925 that the result is not "failed", the analysis processing unit 502 goes to a process in step S903. In step S903, the analysis processing unit 502 refers to a job log table retained by the job log collection unit 503 and searches job logs in which the authentication log 706 agrees with an attribute of the authentication ID 802 of the authentication log of the processing target. Further, the analysis processing unit 502 sorts the searched job logs in an ascending order of the start times 703.

Subsequently, in step S904, the analysis processing unit 502 initializes variables As, Ae, and Ao stored in the RAM 203 of the analysis server 104 by the following values.

As=login time (authentication (login) date and time 804 of authentication log of processing target)
Ae=logout time (logout time 805 of authentication log of processing target)
Ao=timeout time Note that the timeout time is retained by the UI control unit 610 of the multifunction peripheral of an acquisition source of the authentication log and obtained via the network. The analysis processing unit 502 may previously obtain the timeout times of the respective multifunction peripherals.

Subsequently, in a loop of steps S905 to S916, the analysis processing unit 502 executes control for sequentially processing the job logs searched in step S903 as processing targets and executing processes in step S906 to step S915. Note that when no job log is searched in step S903, the analysis processing unit 502 exits the loop of steps S905 to S916 as it is and goes to a process in step S917.

First, in step S906, the analysis processing unit 502 evaluates an expression "As<Ae", and when the analysis processing unit 502 determines that the expression "As<Ae" is true, it goes to a process in step S907. In step S907, the analysis processing unit 502 initializes variables Js, Je, and Jw stored in the RAM 203 of the analysis server 104 as described below.

Js=start time (start time 703 of job log of processing target)

Je=end time (end time 704 of job log of processing target)

Jw=0

Subsequently, in step S908, the analysis processing unit 502 evaluates an expression "Ae<Js", and when the analysis processing unit 502 determines that the expression "Ae<Js" is false, it goes to a process in step S924.

In step S924, the analysis processing unit 502 evaluates the expression "As<Js", and when analysis processing unit 502 determines that the expression "As<Js" is true, it goes to a process in step S909. Note that, when the expression "As<Js" is true, it is shown that a time from a login to a logout overlaps a time from a start of a job to an end of the job. In step S909, the analysis processing unit 502 substitutes a value for the variable Jw showing a corrected in-operation time as shown by "Jw=Je−As". This is a time corresponding to the period 1020 in the conceptual view in FIG. 11. That is, the corrected operating time is a time corrected by adding the in-manipulation time "Js−As" to the job processing time "Je−Js" as conventional in-operation times. Accordingly, the corrected in-operation time may be shown as "Jw=Je−Js+Js−As".

Next, in step S910, the analysis processing unit 502 updates the variable As by the value Je. This is a step for changing the time, which can be used as the corrected in-operation time, Je to Ae because the time As to Je of the time As to Ae, which can be used as the corrected in-operation time, is already used as the corrected in-operation time in step S909. With this operation, A job end time of the processing target is stored as the variable As.

When the process in step S910 ends, the analysis processing unit 502 goes to a process in step S915. In contrast, when it is determined in step S924 that the expression "As<Js" is false, the analysis processing unit 502 goes to a process in step S916, and when a job log which is not yet processed remains, the analysis processing unit 502 shifts the processing target to a next job log. Note that a reason why the expression "As<Js" may become false resides in that plural jobs are executed in parallel and As is changed to end time of another job in place of login time by the process in step S910 to another job log. In this case, the processing target is shifted to a next job log without particularly executing a process thereto to avoid that a corrected in-operation time is calculated by adding an in-manipulation time twice.

In contrast, when it is determined in step S908 that the expression "Ae<Js" is true, the analysis processing unit 502 goes to a process in step S911. Note that when the expression "Ae<Js" is true, this shows that a job starts after a logout. In step S911, the analysis processing unit 502 determines whether the logout cause 806 of an authentication log of the processing target is "timeout", and when the analysis processing unit 502 determines that it is not "timeout", the analysis processing unit 502 goes to a process in step S912.

In step S912, the analysis processing unit 502 calculates the corrected in-operation time Jw by the following calculating formula.

$$Jw=(Je-Js)+(Ae-As)$$

This shows that the corrected in-operation time Jw when a job starts after a logout which is not a timeout is a time obtained by adding the job processing time "Je−Js" to the time "Ae−As" from a login to a logout. In this case, the time "Ae−As" from the login to the logout becomes an in-manipulation time. Accordingly, corrected in-operation time Jw=job processing time "Je−Js"+in-manipulation time "Ae−As" is established. When the process in step S912 ends, the analysis processing unit 502 goes to a process in step S914.

In contrast, when it is determined in step S911 that the logout cause 806 of the authentication log of the processing target is the "timeout", the analysis processing unit 502 goes to a process in step S913. In step S913, the corrected in-operation time Jw is calculated by the following calculating formula.

$$Jw=(Je-Js)+(Ae-As-Ao)$$

This means that the corrected in-operation time Jw by a job log of a job, which starts after a logout due to a timeout, is a time obtained by adding a time, which is obtained by subtracting a timeout time Ao from the time "Ae−As" from the login to the logout, to the job processing time "Je−Js". Note that the time "Ae−As−Ao" is a time corresponding to the period 1110 in the conceptual view in FIG. 12. In this case, the time "Ae−As−Ao", which is obtained by subtracting the timeout time Ao from a time from the login to the logout, becomes the in-manipulation time. Accordingly, corrected in-operation time Jw=job processing time "Je−Js"+in-manipulation time "Ae−As−Ao" is established.

When the process in step S913 ends, the analysis processing unit 502 goes to a process in step S914. Next, in step S914, the analysis processing unit 502 updates the variable As by Ae. This shows that a time, which can be used as the corrected in-operation time, does not remain because the time from the login to the logout is already used as the corrected in-operation time in step S912 or S913. When the process in step S914 ends, the analysis processing unit 502 goes to a process in step S915.

Next, in step S915, the analysis processing unit 502 sets a value of the variable Jw calculated in step S910, S912, or S913 to a column (not shown) of the "corrected in-operation time" of a job log table of the log job. When the process in step S915 ends, the analysis processing unit 502 goes to a process in step S916, and when a non-processed job log still remains, the analysis processing unit 502 shifts the processing target to a next job log. In contrast, when it is determined in step S906 that the expression "As<Ae" is false, the analysis processing unit 502 goes to a process in step S916, and when the non-processed job log still remains, the analysis processing unit 502 shifts the processing target to the next job log. Note that, when the expression "As<Ae" is false, this means that although the time As to Ae is a time which can be added to the in-operation time, since the variable As is updated by the processes in step S910 or S914, a time, which can be used as the corrected in-operation time, does not remain.

When loop processes in steps S905 to S916 end and a correction process to all of the job logs (all of the job logs searched in step S903) relating to the authentication log of the processing target ends, the analysis processing unit 502 goes to a process in step S917. In step S917, the analysis processing unit 502 evaluates the expression "As<Ae", and when the analysis processing unit 502 determines that the expression "As<Ae" is false, it goes to step S923 and ends the process. This means that a time which can be added as the in-operation time does not remain.

In contrast, when it is determined in step S917 that the expression "As<Ae" is true, the analysis processing unit 502 goes to a process in step S918. In step S918, the analysis processing unit 502 determines whether the attribute of the authentication route 807 of the authentication log of the processing target is the "panel", and when the analysis processing unit 502 determines that it is not the "panel", the analysis processing unit 502 goes to step S923 and ends the process. This case includes a case where the authentication route is the "Web". When the authentication route is the "Web", a time in which the user only accesses a browser is not included in the in-operation time, and only when a job is issued, an in-manipulation time for issuing the job is included in the in-operation time.

In contrast, when it is determined in step S918 that the attribute of the authentication route 807 of the authentication log of the processing target is the "panel", the analysis processing unit 502 goes to a process in step S919. The analysis processing unit 502 determines in step S919 whether the logout cause 806 of the authentication log of the processing target gets the "timeout", and the analysis processing unit 502 determines that the logout cause 806 does not get the "timeout", it goes to a process in step S920. In step S920, the analysis processing unit 502 calculates a corrected in-operation time Aw of the authentication log by the following calculating formula.

$$Aw=Ae-As$$

This shows that the corrected in-operation time Aw of the authentication log, which does not get the "timeout", becomes the time "Ae−As" (in-manipulation time) from the login to the logout.

When the process in step S920 ends, the analysis processing unit 502 goes to a process in step S922. In contrast, when it is determined in step S919 that the logout cause 806 of the authentication log gets the "timeout", the analysis processing unit 502 goes to a process in step S921. In step S921, the analysis processing unit 502 calculates the corrected in-operation time Aw of the authentication log by the following calculating formula.

$$Aw=Ae-As-Ao$$

This shows that the corrected in-operation time Aw of the authentication log which gets the "timeout" becomes a time (in-manipulation time) obtained by subtracting the timeout time Ao from the time "Ae−As" from the login to the logout. This is a time corresponding to the period 1110 in the conceptual view in FIG. 12.

When the process in step S921 ends, the analysis processing unit 502 goes to a process in step S922. Note that "As" used in steps S920 or S921 may be changed from the authentication (login) date and time 804 as an initial value in steps before the above steps. This is a case where "As" is already used for correction and addition in the in-operation time processes (steps S905 to S916) of the job log. In this case, "As" is set to end time and the like of a final job. For example, in step S920, a time from the end time 1013 in the row 711 in FIG. 11 to the logout time 1003 in the row 811 is used for the corrected in-operation time Aw as an in-manipulation time.

Subsequently, in step S922, the analysis processing unit 502 sets Aw calculated in step S920 or S921 to a column (not illustrated) of the "corrected in-operation time" of the authentication log of the authentication log table and ends the in-operation time calculation process (steps S923).

Next, an in-operation time addition process in step S1507 in FIG. 10 will be described in detail referring to FIGS. 14 to 15. The analysis result table in which an analysis result (in-operation time addition result) is output in step S1507 in FIG. 10 will be described. FIG. 14 is a view illustrating a configuration of the analysis result table. Note that the analysis result table is stored in the storage device 211. In FIG. 14, reference numeral 1401 denotes a multifunction peripheral ID to which an ID for identifying the multifunction peripheral is set. Reference numeral 1402 denotes an in-operation time in which an in-operation time calculated by the in-operation time addition process in step S1507 in FIG. 10 is stored.

Figure 15:
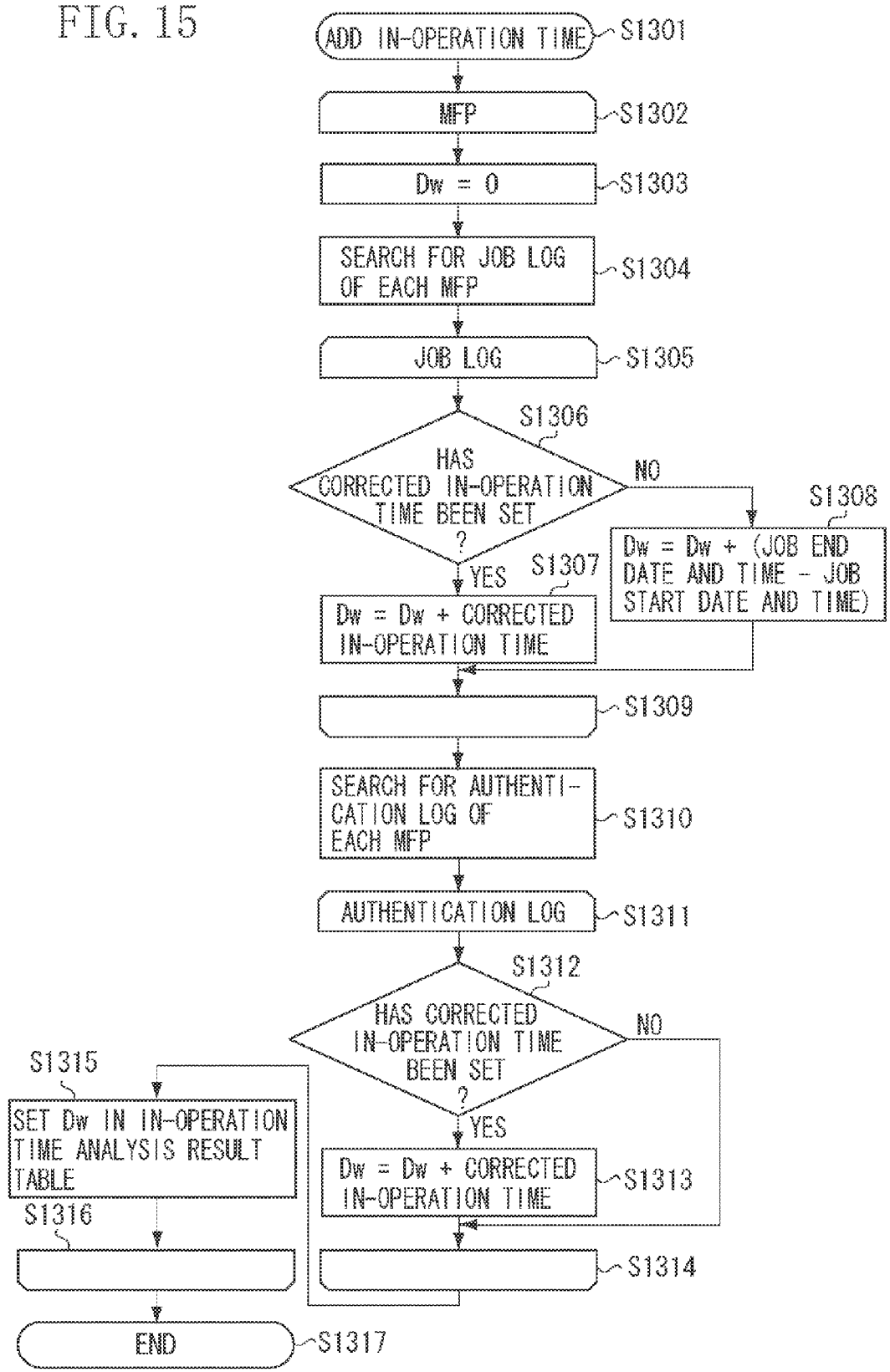
FIG. 15 is a flowchart illustrating an in-operation time addition process in step S1507 in FIG. 10.

FIG. 15 is a flowchart illustrating an example of a detailed flow of the in-operation time addition process illustrated in step S1507 in FIG. 10. The process illustrated in the flowchart is executed by the analysis processing unit 502 of the analysis server 104. That is, the process is realized by the CPU 201 of the analysis server 104, which reads and executes a program stored in the HD 211 and the like of the analysis server 104.

First, in step S1301, the analysis processing unit 502 starts the in-operation time addition process. Next, in a loop of steps S1302 to S1316, the analysis processing unit 502 executes control for sequentially processing the respective multifunction peripherals managed by the analysis server 104 as processing targets and executing processes in step S1303 to S1315.

First, in step S1303, the analysis processing unit 502 initializes the variable Dw, which shows the in-operation time of the multifunction peripheral of the processing target stored in the RAM 203 of the analysis server 104, by "0". Subsequently, in step S1304, the analysis processing unit 502 searches a job log of the multifunction peripheral of the processing target by a job log table retained by the job log collection unit 503. Next, in a loop of steps S1305 to S1309, the analysis processing unit 502 executes control for sequentially processing all of the job logs searched in step S1304 as processing targets and executing processes in steps S1306 to S1318.

First, in step S1306, the analysis processing unit 502 determines whether the "corrected in-operation time" of a job log of the processing target is set, and when the analysis processing unit 502 determines that the "corrected in-operation time" is set, it goes to a process in step S1307. In step S1307, the analysis processing unit 502 adds the "corrected in-operation time" of the job log to a variable Dw. Note that, as illustrated in the flowchart in FIG. 13, the "corrected in-operation time" of the job log means job in-operation time+processing time.

In contrast, when the analysis processing unit 502 determines in step S1306 that the "corrected in-operation time" of the job log of the processing target is not set, it goes to a process in step S1308. In step S1308, the analysis processing unit 502 adds a time, which is obtained by subtracting the start time 703 from the end time 704 of the job log of the processing target, to the variable Dw. This means that when the in-operation time is not corrected by the authentication log, the processing time of a job is added as the in-operation time. When the process in step S1307 or S1308 ends, the analysis processing unit 502 goes to a process in step S1309, and when a non-processed job log still remains, it shifts the processing target to a next job log.

In contrast, when the analysis processing unit 502 determines in step S1309 that all of the job logs searched in step S1304 have been processed in step S1306 to S1308, it exits a loop of steps S1305 to S1309 and goes to a process in step S1310. In step S1310, the analysis processing unit 502 searches the authentication log of the multifunction peripheral of the processing target by the authentication log table retained by the authentication log collection unit 504. Next, in a loop of steps S1311 to S1314, the analysis processing unit 502 executes control for sequentially processing all of the authentication logs searched at the S1310 as processing targets and executing processes in steps S1312 to S1313.

First, in step S1312, the analysis processing unit 502 determines whether the "corrected in-operation time" of the authentication log of the processing target is set, and when the "corrected in-operation time" is set, the analysis processing unit 502 goes to a process in step S1313. In step S1313, the analysis processing unit 502 adds the "corrected in-operation time" of the authentication log to the variable Dw and goes to a process in step S1314. In contrast, in step S1312, when the analysis processing unit 502 determines that the "corrected in-operation time" of the authentication log of the processing target is not set, it goes to a process in step S1314 as it is.

When a non-processed authentication log still exists, the analysis processing unit 502 shifts the processing target to a next authentication log step in step S1314. In contrast, when the analysis processing unit 502 determines in step S1314 that all of the job logs searched in step S1310 have been processed in step S1312 to S1313, it exits a loop of steps S1311 to S1314 and goes to a process in step S1315.

Next, in step S1315, the analysis processing unit 502 adds a row to an in-operation time analysis result table illustrated in FIG. 14, sets an identifier of the multifunction peripheral of the processing target to the multifunction peripheral ID 1401, and sets Dw to the in-operation time 1402. When a non-processed multifunction peripheral remains in step S1316, the analysis processing unit 502 shifts the processing target to a next multifunction peripheral. In contrast, when the analysis processing unit 502 determines in step S1316 that all of the multifunction peripherals have been processed in step S1303 to S1315, the analysis processing unit 502 exits a loop of steps S1302 to S1316 and ends the processes (steps S1317).

As described above, since the in-operation time of the device is calculated by adding the user in-manipulation time by the authentication log (specified by the authentication log and the authentication log) to the job processing time by the job log, the in-operation time of the device nearer to an actual in-operation time can be calculated. Note that, in steps S909, S912, and S913 in FIG. 13, the value, which is obtained by adding the user in-manipulation time to the job processing time, is calculated as the corrected in-operation time by the job log. However, in steps S909, S912, and S913 in FIG. 13, the user in-manipulation time may be calculated as an "in-manipulation time" by a job log. In this configuration, step S1307 in FIG. 15 is set to DW=DW+"in-operation time"+ (job end time−job start time). With this configuration, a result similar to the exemplary embodiment described above can be obtained.

In the first exemplary embodiment, since the authentication ID of the job log of the multifunction peripheral is set, a relation between the authentication log and the job log is apparent. In a second the exemplary embodiment of the invention, a method for relating a job log to an authentication log when an authentication ID is not set to a job log of a multifunction peripheral will be described. That is, in a job log information table according to the present exemplary embodiment, it is assumed that a column of an authentication ID 706 is not set.

Figure 16:
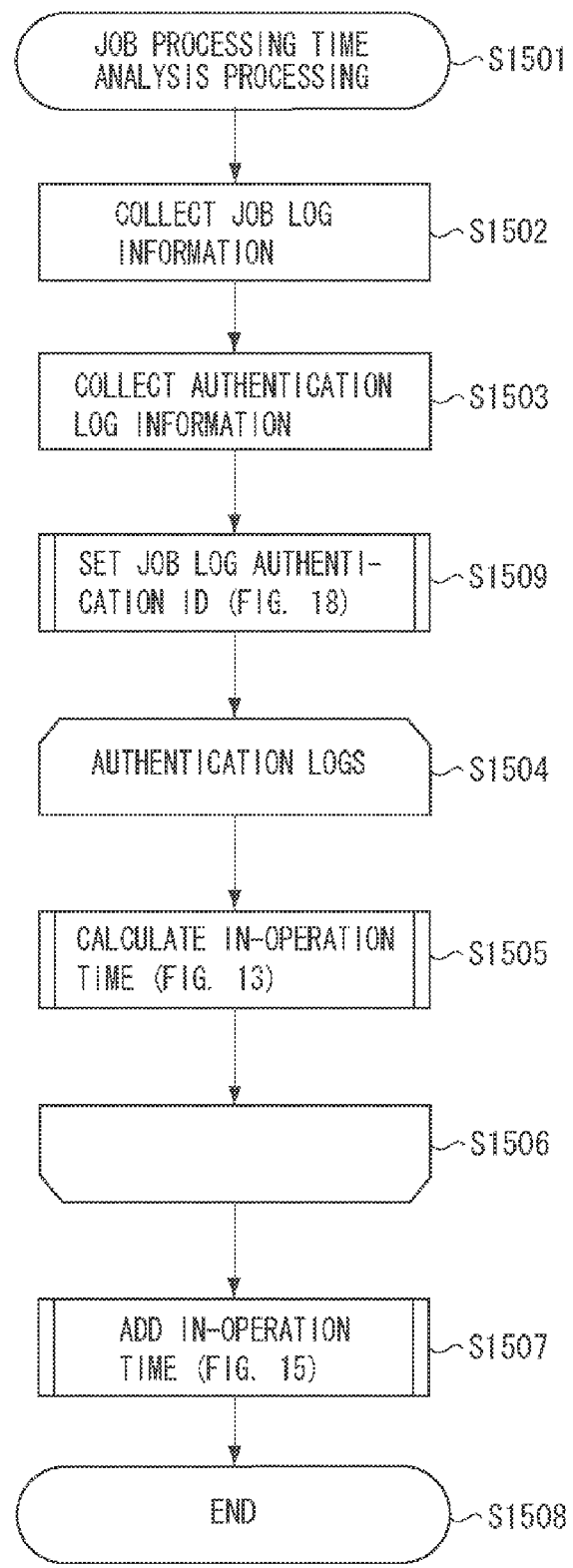
FIG. 16 is a flowchart illustrating an analysis processing of an in-operation time according to a second exemplary embodiment of the invention.

FIG. 16 is a flowchart illustrating a flow by the analysis server 104 in the second exemplary embodiment. A process illustrated in the flowchart is executed by respective functional units of the analysis server 104. That is, the process is realized by the CPU 201 of the analysis server 104, which reads and executes a program stored in the HD 211 and the like of the analysis server 104. Note that an analysis process of an in-operation time in the present exemplary embodiment is executed by adding step S1509 between step S1503 and step S1504 of the analysis process of the in-operation time illustrated in FIG. 10 in the first the exemplary embodiment described above.

In step S1509 in FIG. 16, the analysis process unit 502 executes an authentication ID setting process (FIG. 18) for setting an authentication ID to a job log. The authentication ID setting process in step S1509 will be described below referring to FIGS. 17 and 18. First, an authentication route/job type relating table retained by an analysis process unit 502 of the analysis server 104 will be described using FIG. 17. FIG. 17 is a view illustrating the authentication route/job type relating table retained by the analysis process unit 502 of the analysis server 104. As illustrated in FIG. 17, the authentication route/job type relating table shows an authentication route 1701 and a job type 1702 capable of being related to an authentication log of the authentication route.

A record of the row 1711 shows that an authentication log whose authentication route is "panel" (operation panel) can be related to a job log whose job type is "copy", "box print", and "scan". Likewise, a record of the row 1712 shows that an authentication log whose authentication route is "Web" (Web browser) can be related to a job log whose job type is "box print". Likewise, a record of the row 1713 shows that an authentication log whose authentication route is "driver" can be related to a job log whose job type is "print".

A job type to be issued changes depending on by which module the user executes a manipulation. Therefore, the table is used to prevent a non-relational authentication log from being related to a job log by mistake. Note that the authentication route/job type relating table can be fixed to a system or can be set by the user.

Figure 18:
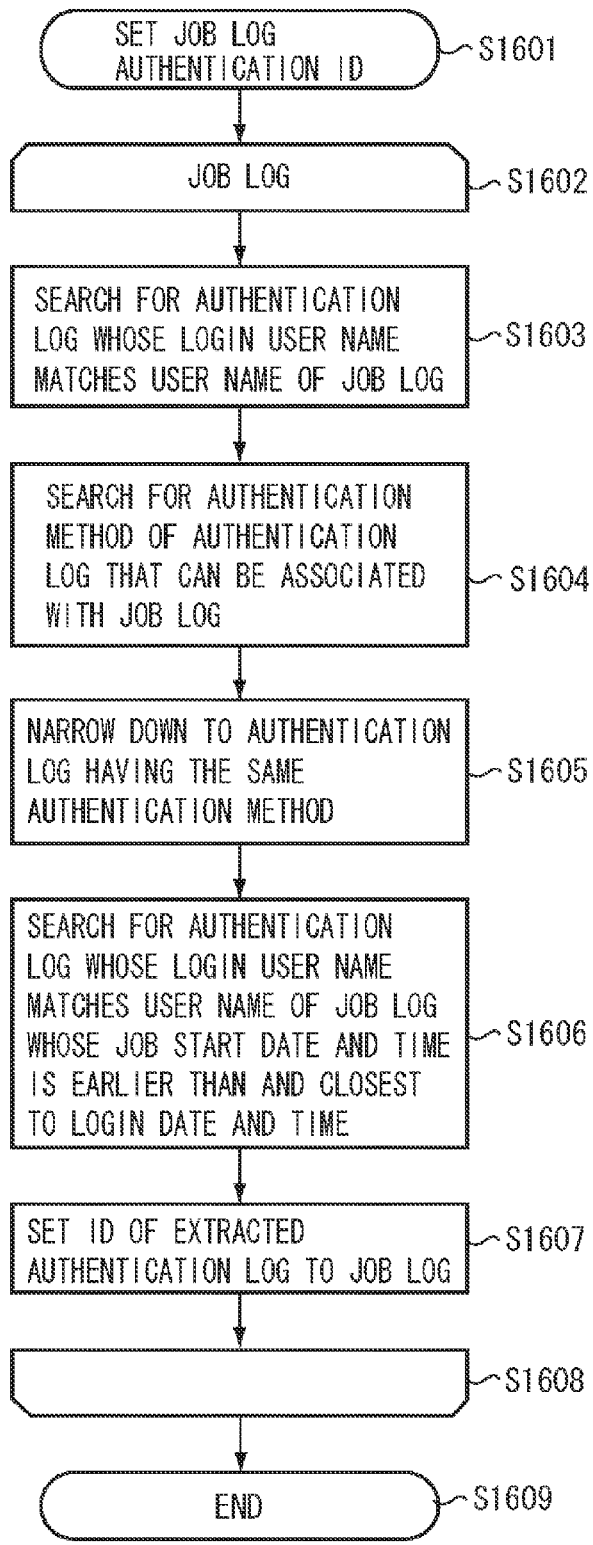
FIG. 18 is a flowchart illustrating an authentication ID setting process in step S1509 in FIG. 16.

Next, a flow of a detailed process of job log authentication ID setting step S1509, which is processed by the analysis process unit 502, will be described using a flowchart illustrated in FIG. 18. The process shown in the flowchart is executed by the analysis process unit 502 of the analysis server 104. That is, the process is realized by the CPU 201 of the analysis server 104, which reads and executes a program stored in the HD 211 and the like of the analysis server 104. First, in step S1601, the analysis process unit 502 starts the authentication ID setting process. In a loop of step S1602 to S1608, the analysis process unit 502 executes control for sequentially processes job logs collected by the job log collection unit 503 as processing targets and executing processes in steps S1603 to S1607.

First, in step S1603, the analysis processing unit 502 searches an authentication log in which a user name 705 of a job log of a processing target agrees with a login user name (user name 803). Subsequently, in step S1604, the analysis process unit 502 refers to the authentication route/job type relating table in FIG. 17, searches a row in which a job type 702 of a job log of the processing target is included in a column of the job type 1702, and obtains the authentication route 1701 in the row. When, for example, the job type is "box print", rows 1711 and 1712, in which "box print" is included in the column of the job type 1702, are searched, and "panel" and "Web" which are the authentication route 1701 in the row are obtained. Subsequently, in step S1605, the analysis process unit 502 searches an authentication log, in which an authentication route 807 of the authentication log is included in the authentication route obtained in step S1604 in the authentication logs searched in step S1603.

Next, in step S1606, the analysis process unit 502 selects an authentication log which is a nearest authentication (login) time 804 before start time 703 of a job log in the authentication logs searched in step S1605. Next, in step S1607, the analysis process unit 502 sets an authentication ID of an authentication log selected in step S1606 to the column of the authentication ID 706 of the job log of a job log table retained by the job log collection unit 503 and relates the job log to the authentication log. That is, the authentication ID of the authentication log selected in step S160 is set to an authentication ID 706 of the job log of the processing target in the job log table, and the job log is related to the authentication log.

In step S1608, the analysis process unit 502 determines whether the processes in steps S1603 to S1607 have been ended to all of the job logs, and when they have not been yet ended, the analysis process unit 502 shifts the processing target to a next job. In contrast, when the analysis process unit 502 determines that the processes in steps S1603 to S1607 have been ended to all of the job logs, it exits a loop of steps S1602 to S1608 and ends the authentication ID setting process (step S1609).

Thereafter, the analysis process unit 502 analyzes a job processing time by executing the processes in step S1504 and subsequent steps in FIG. 16 using the job logs related as described above and the authentication log. As described above, even if a relation of the authentication log to the job log is not apparent, an in-operation time of a device nearer to a time in which the device is actually used can be calculated by relating the authentication log to the job log from the relation of the user name, the login time, and processing time.

Note that it is needless to say that the configurations and the contents of the various types of data described above are not limited thereto and can be arranged by various configurations and contents depending on a use and an object. A described above, although an exemplary embodiment has been shown, the invention can employ an embodying mode as, for example, a system, an apparatus, a method, a program, a storage medium (recording medium), and the like. Specifically, the invention may be applied to a system composed of a plurality of devices and further applied to an apparatus composed of a single device.

In the calculation of an in-operation time of a device, a time in which the device is used must be measured. However, since a conventional method calculates the in-operation time of the device only by a job processing time, the method is insufficient. The exemplary embodiment can calculate an in-operation time of a device nearer to a time in which the device is actually used by correcting an in-operation time of the device using the authentication log and presuming a time from a start of a manipulation of a user to a completion of a job.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-060640 filed Mar. 13, 2009, which is hereby incorporated by reference herein in its entirety.

What is claimed is:

1. An information processing apparatus configured to calculate an in-operation time of an image processing apparatus, the information processing apparatus comprising:
   an authentication log acquisition unit configured to acquire an authentication log including information capable of specifying login time and logout time of a login process in the image processing apparatus;
   a job log acquisition unit configured to acquire a job log including information capable of specifying job start time and job end time of a job processed by the image processing apparatus; and
   a calculation unit configured to calculate the in-operation time of the image processing apparatus based on a first in-operation period corresponding to a job processing period specified by the job log and a second in-operation period corresponding to a period other than a job processing period specified from a job log relating to the authentication log, in a login period specified from the authentication log,
   wherein the second in-operation period corresponds to an in-manipulation time during which the user inputs to the image processing apparatus, and
   wherein, as to a login period specified by an authentication log whose logout cause is specified to be timeout, the calculation unit does not include a period necessary to the timeout into the second in-operation period.

2. The information processing apparatus according to claim 1, wherein the authentication log includes information for specifying whether a corresponding login process is executed by a user manipulation via a network; and
   wherein, as to a login period specified from an authentication log whose login process is specified to be executed by a user manipulation via a network, the calculation unit does not include, in the second in-operation period, a period from end time to logout time of a latest job processing period in a job processing period of a job log relating to the authentication log.

3. The information processing apparatus according to claim 1, wherein the authentication log includes information for specifying whether a corresponding login process is executed by a printer driver; and
   wherein the calculation unit does not include, in the second in-operation period, a login period specified from an authentication log whose login process is specified to be executed by a printer driver.

4. The information processing apparatus according to claim 1, wherein the authentication log includes a user name when a corresponding login process is executed;
   wherein the job log includes a user name who issues a corresponding job; and
   wherein the calculation unit specifies a job log relating to the authentication log by the user name.

5. The information processing apparatus according to claim 4, wherein the calculation unit specifies a job log whose job start time is later than login time of the authentication log and is nearest to the login time as job log information relating to the authentication log.

6. The information processing apparatus according to claim 1, wherein the authentication log includes information for specifying an authentication route of a corresponding login process;
   wherein the job log includes information for specifying a job type of a corresponding job; and
   wherein the calculation unit specifies that the authentication log and the job log relate to each other when a combination of the job type included in the job log and the authentication route included in the authentication log agrees with a previously set combination of a job type and an authentication route.

7. The information processing apparatus according to claim 1, wherein the authentication log includes an authentication ID issued when a corresponding login process is executed;
- wherein the job log includes an authentication ID corresponding to a login process when a corresponding job is processed; and
- wherein the calculation unit specifies a job log relating to the authentication log by the authentication ID.

8. A method for calculating an in-operation time of an image processing apparatus, the method comprising the steps of:
- acquiring an authentication log including information capable of specifying login time and logout time of a login process in the image processing apparatus;
- acquiring a job log including information capable of specifying job start time and job end time of a job processed by the image processing apparatus; and
- calculating the in-operation time of the image processing apparatus based on a first in-operation period corresponding to a job processing period specified by the job log and a second in-operation period corresponding to a period other than a job processing period specified from a job log relating to the authentication log, in a login period specified from the authentication log,
- wherein the second in-operation period corresponds to an in-manipulation time during which the user inputs to the image processing apparatus,
- wherein, as to a login period specified by an authentication log whose logout cause is specified to be timeout, the calculation unit does not include a period necessary to the timeout into the second in-operation period, and
- wherein the steps are executed by a processor.

9. A non-transitory computer-readable storage medium storing a computer program for causing a computer to execute a method for calculating an in-operation time of an image processing apparatus, the method comprising:
- acquiring an authentication log including information capable of specifying login time and logout time of a login process in the image processing apparatus;
- acquiring a job log including information capable of specifying job start time and job end time of a job processed by the image processing apparatus; and
- calculating the in-operation time of the image processing apparatus based on a first in-operation period corresponding to a job processing period specified by the job log and a second in-operation period corresponding to a period other than a job processing period specified from a job log relating to the authentication log, in a login period specified from the authentication log,
- wherein the second in-operation period corresponds to an in-manipulation time during which the user inputs to the image processing apparatus, and
- wherein, as to a login period specified by an authentication log whose logout cause is specified to be timeout, the calculation unit does not include a period necessary to the timeout into the second in-operation period.

* * * * *